US012453489B2

(12) United States Patent
Chamberlain et al.

(10) Patent No.: US 12,453,489 B2
(45) Date of Patent: Oct. 28, 2025

(54) ELECTRONIC EQUIPMENT FOR THE TREATMENT AND CARE OF LIVING BEINGS

(71) Applicant: Tintro Limited, Penrith (GB)

(72) Inventors: Alan Chamberlain, Lancaster (GB); Nigel John Walker, Penrith (GB); Stephen Aubrey Clark, Penrith (GB)

(73) Assignee: Tintro Limited, Penrith (GB)

( * ) Notice: Subject to any disclaimer, the term of this patent is extended or adjusted under 35 U.S.C. 154(b) by 1287 days.

(21) Appl. No.: 15/930,862

(22) Filed: May 13, 2020

(65) Prior Publication Data

US 2020/0315497 A1  Oct. 8, 2020

Related U.S. Application Data

(63) Continuation of application No. 15/568,528, filed as application No. PCT/GB2016/051123 on Apr. 22, 2016, now abandoned.

(30) Foreign Application Priority Data

Apr. 22, 2015 (GB) .................................. 1506810
Mar. 23, 2016 (GB) .................................. 1604925
Apr. 20, 2016 (GB) .................................. 1606860

(51) Int. Cl.
*A61B 5/11* (2006.01)
*A61B 5/00* (2006.01)

(52) U.S. Cl.
CPC .............. *A61B 5/1121* (2013.01); *A61B 5/11* (2013.01); *A61B 5/4566* (2013.01);
(Continued)

(58) Field of Classification Search
CPC ....... A61B 5/1121; A61B 5/11; A61B 5/4566; A61B 5/6804; A61B 5/1114; A61B 5/112;
(Continued)

(56) References Cited

U.S. PATENT DOCUMENTS 3,972,038 A  7/1976  Fletcher et al.
6,018,705 A  1/2000  Gaudet
(Continued)

OTHER PUBLICATIONS

International Search Report and Written Opinion for corresponding Patent Application No. PCT/GB2016/051123 dated Oct. 14, 2016.

*Primary Examiner* — Navin Natnithithadha
(74) *Attorney, Agent, or Firm* — Renner, Otto, Boisselle & Sklar, LLP (57) ABSTRACT

An apparatus, and the method of using it, comprising one, or more, electronic sensors attached to a part(s) of a human or animal's body. The patient then performs an activity, or has an activity performed on them, and the results of the measured parameters are recorded by the sensor and processed, or downloaded and processed. The sensor may include a range of instrumentation, e.g. accelerometers, magnetometers, gyroscopes, force sensors, etc. to record positions (in the X, Y and Z planes), movements, angular movements, forces, stresses in bones/joints, etc. The use of the apparatus and method are appropriate to medical treatments, and perfecting sporting or dancing techniques and the results are processed to give the clinician or coach appropriate information to improve the problem being addressed. Methods for measuring lateral angular movement of hinged joints and spinal extension are taught.

7 Claims, 4 Drawing Sheets

(52) U.S. Cl.
CPC ........... *A61B 5/6804* (2013.01); *A61B 5/1114* (2013.01); *A61B 5/112* (2013.01); *A61B 2562/0204* (2013.01); *A61B 2562/0219* (2013.01)

(58) Field of Classification Search
CPC .... A61B 2562/0204; A61B 2562/0219; A61B 5/6801
See application file for complete search history.

(56) References Cited

U.S. PATENT DOCUMENTS

| | | | |
|---|---|---|---|
| 6,298,314 B1 | 10/2001 | Blackadar | |
| 6,493,652 B1 | 12/2002 | Ohlenbusch | |
| 6,611,789 B1 | 8/2003 | Darley | |
| 6,699,199 B2 | 3/2004 | Asada | |
| 6,876,947 B1 | 4/2005 | Darley | |
| 6,882,955 B1 | 4/2005 | Ohlenbusch | |
| 6,898,550 B1 | 5/2005 | Blackadar | |
| 7,200,517 B2 | 4/2007 | Darley | |
| 7,428,471 B2 | 9/2008 | Darley | |
| 7,428,472 B2 | 9/2008 | Darley | |
| 7,526,389 B2 | 4/2009 | Greenwald | |
| 7,617,071 B2 | 11/2009 | Darley | |
| 7,962,312 B2 | 6/2011 | Darley | |
| 8,333,722 B2* | 12/2012 | Ewing | A61H 3/00 601/5 |
| 8,554,509 B2 | 10/2013 | Crisco, III | |
| 8,712,725 B2 | 4/2014 | Darley | |
| 8,797,165 B2 | 8/2014 | Greenwald | |
| 8,888,720 B2 | 11/2014 | Hudson | |
| 9,247,897 B2 | 2/2016 | Darley | |
| 9,891,718 B2* | 2/2018 | Connor | A61B 5/6826 |
| 10,215,568 B2 | 2/2019 | Klosinski, Jr. | |
| 2007/0027631 A1* | 2/2007 | Cabrera | A61B 5/1124 702/19 |
| 2010/0249672 A1* | 9/2010 | Ewing | A61H 1/024 600/595 |
| 2015/0032034 A1* | 1/2015 | Petrigliano | A61B 5/1122 600/595 |
| 2015/0045700 A1* | 2/2015 | Cavanagh | G16H 40/67 600/595 |
| 2016/0220175 A1* | 8/2016 | Tam | A61B 5/4528 |
| 2016/0313798 A1* | 10/2016 | Connor | G06F 3/017 |
| 2018/0110446 A1* | 4/2018 | Chamberlain | A61B 5/4566 |
| 2020/0315497 A1* | 10/2020 | Chamberlain | A61B 5/4566 |

* cited by examiner

ELECTRONIC EQUIPMENT FOR THE TREATMENT AND CARE OF LIVING BEINGS

RELATED APPLICATION DATA

This application is a continuation of U.S. patent application Ser. No. 15/568,528 filed Oct. 23, 2017, which is a national phase of International Patent Application No. PCT/GB2016/051123 filed Apr. 22, 2016, which claims priority of United Kingdom Application Nos. 1506810.9 filed Apr. 22, 2015, 1606860.3 filed Apr. 20, 2016 and 1604925.6 filed Mar. 23, 2016, all of which are hereby incorporated by reference.

BACKGROUND

This specification relates to electronic equipment and its use in the medical care and rehabilitation of people and animals as well as in research of medical conditions. It is also relevant to analysing movements of athletes, dancers, and the like to help perfect them and so improve performances and techniques. It is also applicable to inanimate objects.

In the medical field, orthopaedic surgeons and physiotherapists regularly have to measure the angular movement of joints in relation to operations and subsequent rehabilitation. Goniometers, variations of the conventional geometrical protractors, are used for this purpose but the results are more qualitative than quantitative as the angles measured tend to vary from clinician to clinician according to their particular measuring technique. One particular problem is with hip joints; these are ball joints, which can rotate in two planes. In some people, particularly those with arthritis, the joint stiffens and it becomes painful, for example, to rotate the femur which in turn rotates the knee joint, and these people sometimes need complex surgery to replace the joint. Measuring the angle to which the joint can be rotated is very tricky as, when the measurement is taken, the patient naturally tends to twist the lower part of the abdomen, thus confusing the reading. Similar problems occur with shoulder joints.

There are specialised 'garments', varying from sleeves and leggings to whole suits, which a patient can wear, with a large number of electronic sensors positioned thereon so that the exact X, Y and Z coordinates of every point can be fed directly into a computer in real time. This can replicate exactly the patient's movements in real time or in slow motion. This is a powerful tool but requires very high levels of technical support and is far too expensive for general medical use. Practically, is can be justified only for high-value cinematic special effects.

Spines, with their multiple vertebrae, separating discs and nerves running through, are very delicate parts of the skeleton. Overnight, when the patient is asleep and lying horizontally, the spine extends in length (as the discs rehydrate and relax) due to the removal of the person's weight compared to that when they are standing, or sitting, upright. Monitoring the shrinkage during the day and relaxation later can be important in the monitoring of, or treatment of, spinal injuries and conditions but measuring it is very difficult as patients do not normally sleep, or spend the day, in X-ray machines or other scanners.

Some individuals have conditions involving spinal curvature, which can be measured to determine whether the condition can be improved or avoided in the first place. Applicant believes that such shrinkage and relaxation measurements, and curvature determinations, could be made with the invention disclosed herein.

In sporting and dancing contexts, perfecting movements and techniques is important, e.g. in improving performance (sports) or minimising injuries (sport and ballet). One example is in bowling cricket balls, where players with unorthodox actions are often accused of 'throwing', i.e. keeping the bowling arm with an elbow extension of more than 15°. By attaching sensors to the upper and lower arms, the bowler's action can be monitored in real time to check whether the elbow is extending by a greater, or lesser amount. The device could be able to measure the number of bowls and throws during a given period.

Thus, there is an urgent need for a means to improve medical techniques in the orthopaedic field, to improve sporting and dancing performances and techniques, and to avoid an initially healthy subject doing permanent damage.

SUMMARY

According to a first embodiment of the invention, there is provided:—
  i) an electronic sensing device, attachable to a part of a patient's body, and including:—
    a) a means of providing electrical power;
    b) a means to sense and measure/monitor one or more parameters relevant to that part of the patient's body the means including an accelerometer and/or a radio or acoustic sensor; and
    c) a means to record the measured/monitored readings and store them for subsequent downloading and/or transmission to a separate receiving unit; and
  ii) an optional receiving unit able to receive downloaded or transmitted readings from the sensing device and either process and display them directly or pass them to a further unit for processing and/or display;
  iii) optional further processing either in the electronic sensing device or in the receiving unit or in the further unit to collate, analyse and display the results of the analysis of the net reading from the sensor;
  characterised in that the sensing device is attached to an appropriate part of the patient who then performs an activity or has an activity performed on them and a parameter(s) of their body's reaction to the activity is/are measured/monitored and recorded/analysed and the results displayed/transmitted by the sensing device to or via the receiving unit for further processing and/or display for the subsequent benefit of the patient.

According to a first variation of the first embodiment of the apparatus of the invention, the electronic sensing device is attached to the patient by means of a strap.

According to a second variation of the first embodiment of the apparatus of the invention, the electronic sensing device is attached to the patient by adhesive means.

According to a third variation of the first embodiment of the apparatus of the invention, the means of providing electrical power is a battery or rechargeable cell.

According to a fourth variation of the first embodiment of the apparatus of the invention, the means of providing electrical power uses the patient's own body heat and/or energy harvested from motion or electromagnetic means.

According to a fifth variation of the first embodiment of the apparatus of the invention, the measured/monitored parameter is the patient's pulse and/or a heart rhythm(s).

According to a sixth variation of the first embodiment of the apparatus of the invention, the measured/monitored parameter relates to the patient's musculature.

According to a seventh variation of the first embodiment of the apparatus of the invention, the measured/monitored parameter relates to the patient's brain rhythm(s).

According to an eighth variation of the first embodiment of the apparatus of the invention, the measured/monitored parameter relates to the patient's breathing.

According to a ninth variation of the first embodiment of the apparatus of the invention, the measured/monitored parameter relates to the patient's joint movements.

According to a tenth variation of the first embodiment of the apparatus of the invention, the electronic sensing device includes an accelerometer.

According to an eleventh variation of the first embodiment of the apparatus of the invention, the electronic sensing device includes a magnetometer.

According to a twelfth variation of the first embodiment of the apparatus of the invention, the electronic sensing device includes a gyroscope.

According to a thirteenth variation of the first embodiment of the apparatus of the invention, the electronic sensing device includes a force sensor.

According to a fourteenth variation of the first embodiment of the apparatus of the invention, the electronic sensing device includes an accurate timing clock.

According to a fifteenth variation of the first embodiment of the apparatus of the invention, the receiving unit is either a device carried by the patient or a separate item not connected to the patient.

According to a sixteenth variation of the first embodiment of the apparatus of the invention, the means of downloading or transmission is via either hard wiring or electronic transmission.

According to a second embodiment of the invention, there is provided:—
  i) two, or more, electronic sensing devices, attachable to parts of a patient's body, and each including:—
    a) a means of providing electrical power;
    b) a means to sense and measure/monitor one or more parameters relevant to that part of the patient's body; and
    c) a means to record the measured/monitored readings and store them, or to compute a net reading and store it, for downloading and/or transmission to a separate receiving unit;
  ii) a receiving unit able to receive downloaded and/or transmitted readings/net readings from the electronic sensing device(s) and either process and display them directly or pass them to a further unit for processing and display; and
  iii) optional further processing in any one of the electronic sensing devices or in the receiving unit or in the further processing unit to collate, analyse and/or display the results of the analysis of the net reading from the two, or more, sensors;
  characterised in that the sensing devices are attached to appropriate parts of the patient's body who then performs an activity or has an activity performed on them, and that a parameter(s) of their body's reaction to the activity is/are measured/monitored and recorded/analysed and the results displayed/transmitted to or via the receiving unit for processing and display for the subsequent benefit of the patient, said processing being wholly, or in a part of either/or the electronic sensing device, the receiving unit or the further processing unit.

According to a first variation of the second embodiment of the apparatus of the invention, the electronic sensing devices are attached to the patient by means of a strap.

According to a second variation of the second embodiment of the apparatus of the invention, the electronic sensing devices are attached to the patient by adhesive means.

According to a third variation of the second embodiment of the apparatus of the invention, the means of providing electrical power is a battery or rechargeable cell.

According to a fourth variation of the second embodiment of the apparatus of the invention, the means of providing electrical power uses the patient's own body heat and/or energy harvested from motion or electromagnetic means.

According to a fifth variation of the second embodiment of the apparatus of the invention, the measured/monitored parameter is the patient's pulse and/or a heart rhythm(s).

According to a sixth variation of the second embodiment of the apparatus of the invention, the measured/monitored parameter relates to the patient's musculature.

According to a seventh variation of the second embodiment of the apparatus of the invention, the measured/monitored parameter relates to the patient's brain rhythm(s).

According to an eighth variation of the second embodiment of the apparatus of the invention, the measured/monitored parameter relates to the patient's breathing.

According to a ninth variation of the second embodiment of the apparatus of the invention, the measured/monitored parameter relates to the patient's joint movements.

According to a tenth variation of the second embodiment of the apparatus of the invention, the electronic sensing device includes an accelerometer.

According to an eleventh variation of the second embodiment of the apparatus of the invention, the electronic sensing device includes a magnetometer.

According to a twelfth variation of the second embodiment of the apparatus of the invention, the electronic sensing device includes a gyroscope.

According to a thirteenth variation of the second embodiment of the apparatus of the invention, the electronic sensing device includes a force sensor.

According to a fourteenth variation of the second embodiment of the apparatus of the invention, the electronic sensing device includes an accurate timing clock.

According to a fifteenth variation of the second embodiment of the apparatus of the invention, the receiving unit is either a device carried by the patient or a separate item not connected to the patient.

According to a sixteenth variation of the second embodiment of the apparatus of the invention, the means of downloading or transmission is via either hard wiring or electronic transmission.

In a preferred application of the apparatus of the invention, one, or more, electronic sensing device(s) are attached to a patient and used to monitor a parameter(s) of the patient, such as pulse, heart, brain rhythms, etc. The data recorded may be processed by the sensing device itself and downloaded, or downloaded to a portable receiving unit and processed there or further downloaded to a separate processing means, where the results may also be displayed. The sensing devices can also be used to measure the angular movement of joints and parameters relating to musculature. The principle is also applicable to measurement of spinal extensions and to perfecting athletic or dancing techniques.

BRIEF DESCRIPTION OF THE DRAWINGS

For a clearer understanding of the invention and to show how it may be carried into effect, reference will now be made, by way of example only, to the accompanying drawing in which:—

DETAILED DESCRIPTION

In the following description, the same reference numeral is used for the same component in different Figures and/or for different components fulfilling identical functions.

Figure 1:
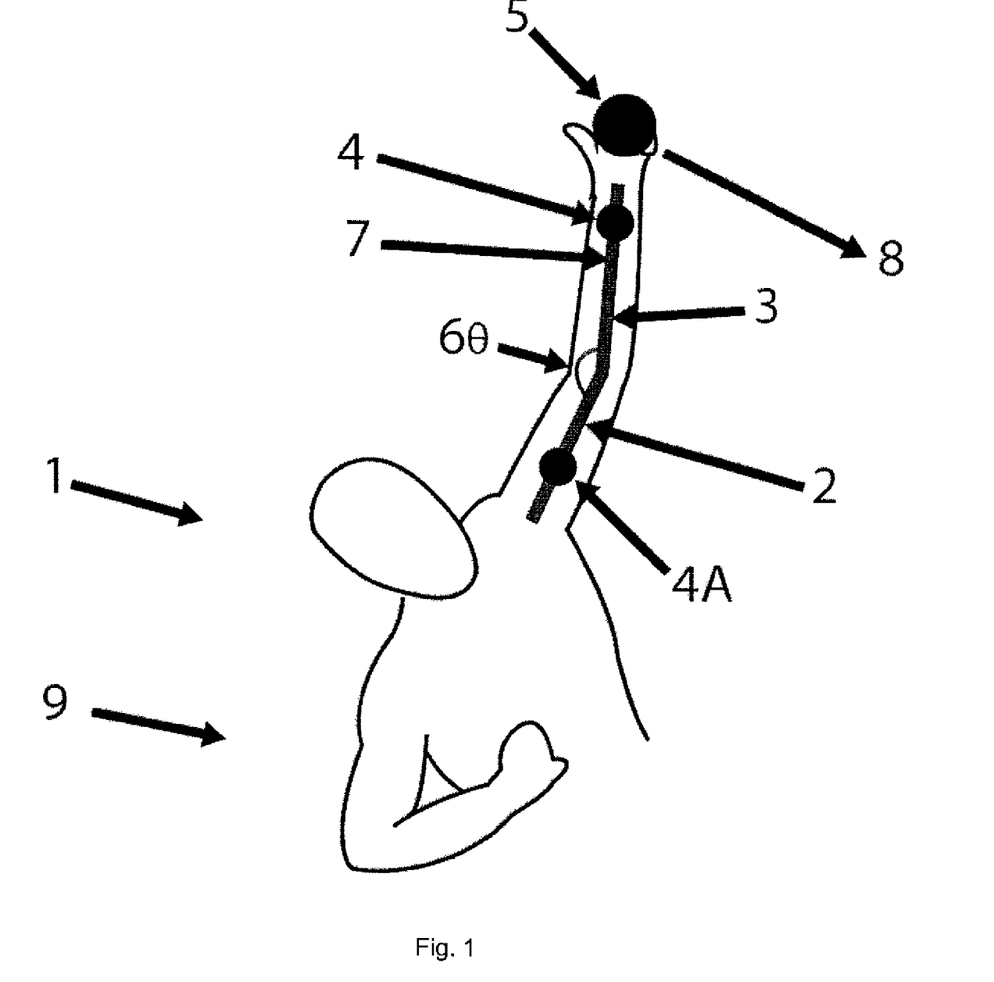
FIG. 1 is a diagrammatic representation of the bowling action of a cricketer showing a flexed arm with an electronic sensing device of the invention attached.

Referring to FIG. 1, a cricketer 1 is shown bowling with the upper 2 and lower 3 right arm flexing through an angle θ at the elbow and with an electronic sensing device (sensor) 4 measuring particular ranges of motion, forces, and speeds of motion. The sensor readings are either recorded for subsequent downloading and analysis or transferred, or processed within the sensor's own computing means. The transfer may be either via hard wiring to a receiving unit (not shown) carried by bowler 1 for processing therein and thence electronically to a separate computing means or directly electronically to the computing means for analysis and display/print out.

Sensor 4 would measure the angular rotation 7 of arm 2, 3 and the acceleration 8 up to when ball 5 is released at specific timed intervals, e.g. every millisecond. If the rotation 7 and acceleration 8 are smooth and progressive, the bowling would be correct and angle θ would be within the 15° allowed. However, if there was a step change or discontinuity in the otherwise smooth action, this would indicate a 'throw'. A particular aspect of the exercise would be to count the number of 'throws' during, say, a match or a practice session as 'throws' cause extra stresses in the bones and joints and could lead to injury or exacerbate an existing injury. Thus, the sensor could lead to improving the technique and minimising the injury risk.

Sensor 4 may be attached adhesively, using a strap or via any other appropriate means to the patient 1.

Another option is to use two sensors, one 4 on lower arm 3 and the other 4A on upper arm 2. If they are synchronised and take regular, simultaneous readings, the angle θ can be directly computed 6 for each pair of readings. The results may be displayed graphically to show where any angular 6 discrepancy occurs and so correct the bowling action. When it is desired to determine the exact position in space of a sensor (e.g. on a bowler's arm), it is normal to have a nearby, fixed datum sensor (not shown) so that, by communicating with each other, it is possible to measure the (arm) sensor's position precisely, i.e. X, Y and Z coordinates and rotational orientations in each plane. Measurements taken at pre-set time intervals can be used to show the exact motion of limbs or joints in real time or slow motion for subsequent analysis. This is a powerful technique and can be used to identify and correct many problems, e.g. to rectify bow-legged gaits in young children.

Though bowling has been used as an example, the principle applies to any activity, e.g. in a sporting or athletic environment, dancing or work-related, etc. The monitoring could be either for a short period in a clinical environment or the patient could wear the sensing device for a period of time, e.g. a day or a few days, with the readings either being stored in a memory within the device itself or transmitted to the receiving unit (not shown), which could be carried in the patient's pocket. The advantage of the long term test is that the patient's normal usage of the limb will be revealed, rather than any 'contrived' usage in the clinical environment. Long term usage will reveal the patient's reactions, both when fresh in the morning and tired in the evening, which could be very helpful for the clinician's diagnosis.

The sensors may include timers, accelerometers, magnetometers, gyroscopes, or anything else as required, which would record the nature of the activities, e.g. sluggish or vigorous. Sensors 4 may have their own power sources, e.g. a battery of rechargeable cell, or generate their own power, e.g. from the motion of the arm 2, 3, from the patient's own body heat using the Seebeck Effect or from electromagnetic signals beamed to the sensor. Sensors 4 with their own power generation could be thinner, e.g. like a plaster, than those incorporating batteries and would be more suited to longer term activity monitoring. The sensors may be used to compute the forces in the bones, tendons, etc. to guard against the risk of stress fractures.

Figure 2:
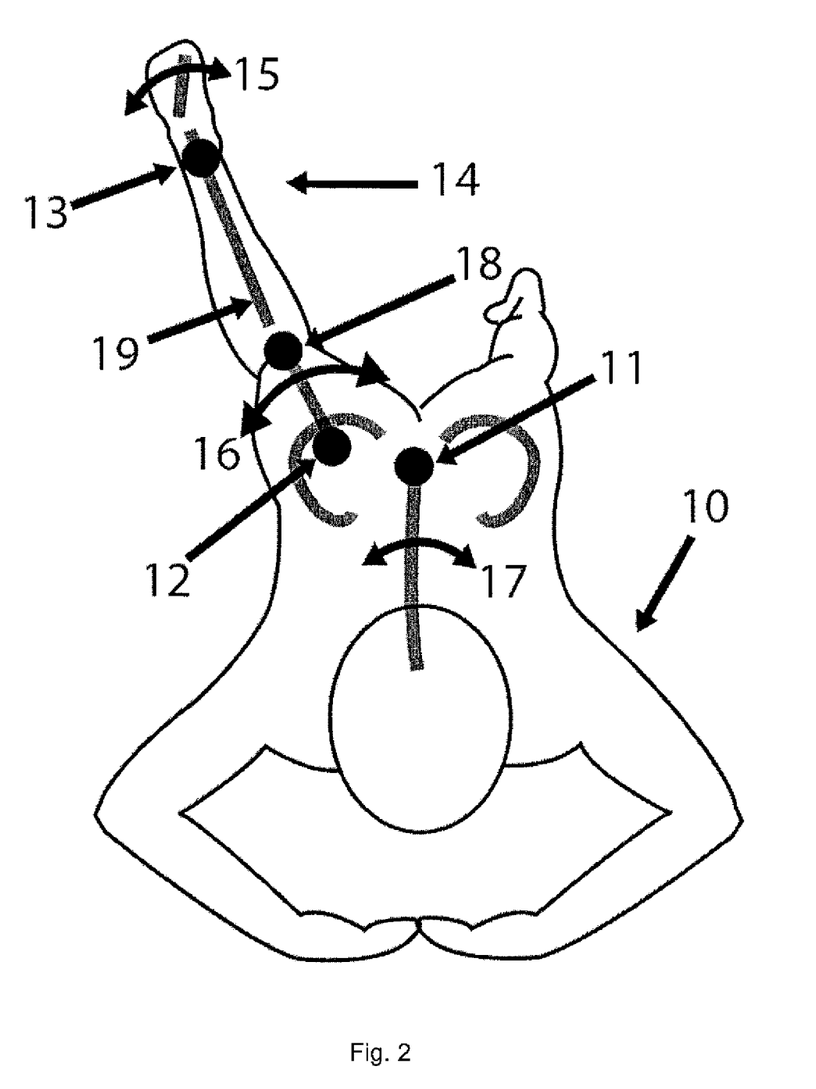
FIG. 2 is a diagrammatic representation of a patient laying prone for the knee angular lateral movement to be measured, showing the position of the electronic sensing devices of the invention.

Referring to FIG. 2, a patient 10 is to have the angular, lateral freedom of their knee 18 measured. The knee is basically a hinge moving in only a single plane and a degree of axial freedom is provided via the ligaments, tendons, hamstrings, and the rotation allowed by the hip joint. The patient may have limited movement in the hip joint, so the leg is bent from side to side and measurements are taken to find how much the patient can move the limb laterally. The measurement is made with patient 10 face down on a firm surface while the lower leg 19, with knee 18 bent at a right angle to the surface, is moved laterally 15 with respect to the plane of the bent leg. In these circumstances, it is natural for the patient to try and roll to one side as a result of the force 14 applied. To accommodate for this, a first sensor 11 is placed on the patient's skin on the sacrum and a second sensor 13 is placed near the ankle of the leg 19 to be measured.

If the sensors 11, 13 include an accelerometer, it can calculate changes in its orientation, using the force of gravity (to define a vertical plane of reference), and offer coordinates from the three axes it senses to other sensors or a further processing device. These coordinates are used to determine the datum angle between the two sensors before the start of the test. Though patient 10 is likely to move their pelvis or hip joint 12 or rotate 16 the femur during the manipulation 14 of lower leg 19, sensors 11 and 13 will communicate with each other and automatically make allowance for the patient's movement to calculate the angular rotation 15 of the knee joint 18 and hip 12 only. Sensors 11 and 13 may communicate with each other at a radio frequency and one of them would make this calculation, using the other's data. Alternatively, the calculation could be done by the receiving unit (not shown) or the further processing unit (not shown). However it is done, it would be an accurate and repeatable figure unlike that available from a current goniometer and so reduce the variability in measurements when taken by different clinicians.

Current physiology practice involves an angle measuring device resembling a combination of a protractor and a pair of compasses called a goniometer. The practitioner uses it to measure the angle between, for example, a leg held vertically in above scenario, and the angle to which the practitioner can comfortably move it to the side. The 'comfort' quality here depends on the patient's state of mind plus the practitioner's professional judgement, and since the patient may report that movement to a certain point becomes uncomfortable on one day, there's no guarantee the same patient would report the same degree of discomfort on another given that they may be feeling better or worse, may have taken different amounts of medication, or may have taken more or less exercise. In addition, the practitioner then has to remove the hip rotation angle to find out how much the patient's femur rotated on its own, which will then give a measurement of how well the hip joint is free to move. The hip rotation is hard to assess, and measurements are dependent on an amount of 'subjectivity' both by the same practitioner on different occasions, and between different practitioners. Sometimes the practitioner has to remind the patient not to roll, but they can't avoid it, and that may not be noticed or can't be taken into account. This makes a reliable measurement of hip joint freedom very hard to make. Accelerometer-based measurement devices are known, but these only measure the one deflection angle on the leg in a similar way to the standard goniometer and do not take force applied into account.

This invention allows the practitioner to find an objective measurement of the deflection angle of the leg minus the angle of the hip rotation, and ensures the measurement is free from the variability and 'subjectivity' common in previous methods. This invention allows the same objective result to be found by the same practitioner at different times, or across different practitioners.

If a force detector is incorporated in the sensor 11, 13, it can record the amount of force the clinician applies when manipulating the patient's lower leg. When combined with the leg's movement, an angle versus force applied calculation can be made and displayed, e.g. as graphs, figures, or a simple indication presented. It is known how far a healthy hip joint can be rotated with a given force, so that the lesser rotation of an unhealthy joint with the same force would give a definitive indication of the extent of stiffness in the joint.

This invention allows a practitioner to arrive at an objective measure of how far a joint may be moved when a predetermined amount of force is applied, and that value may be compared over time on the same patient's joint to allow an assessment of whether the joint is improving or not as a result of treatment, exercise, weight loss, medication, other interventions or life changes. Movement in other joints may also be measured in the same way, and more than one other angle may be subtracted from the final result.

The system may be implemented using two or more mobile phones with an optional extra force sensor. An extra reference phone (not shown) may provide the readings while using others as sensors.

If a magnetometer is included in each electronic sensing device, the exact position, i.e. X, Y and Z coordinates and rotations, of each sensor can be determined with reference to a nearby reference magnet (or datum sensor) (not shown) both before and during (or after) the test.

Another example of the use of this aspect of the invention is the measurement of spinal parameters, e.g. extensions/compressions and curvatures. When in a horizontal position, the patient's weight is not acting to compress the spine, but when the person is standing, sitting vertically, or exercising, the discs between adjacent vertebrae are compressed axially. This results in a slight shrinkage (reduction in axial length or increased bending) of the spine and knowledge of the magnitude and position of the discs involved in this shrinkage gives the clinician an indication of the state of the discs. Overnight, when lying horizontally, the discs re-hydrate and relax and the spine extends and possibly also straightens. However, with currently existing equipment, getting accurate measurements of the shrinkage and/or curvature is problematic. This invention provides a means of accurately finding changes in the static relative positions of points on a body over a period of time, as it can accurately measure absolute distances between sensors and then build a static model of the body using the mesh of distances plus the orientation of gravity. The 3D model is accurate for finely resolving distances because the system calculates distances between sensors rather than relative motion, which is the purpose of motion capture systems.

Figure 3:
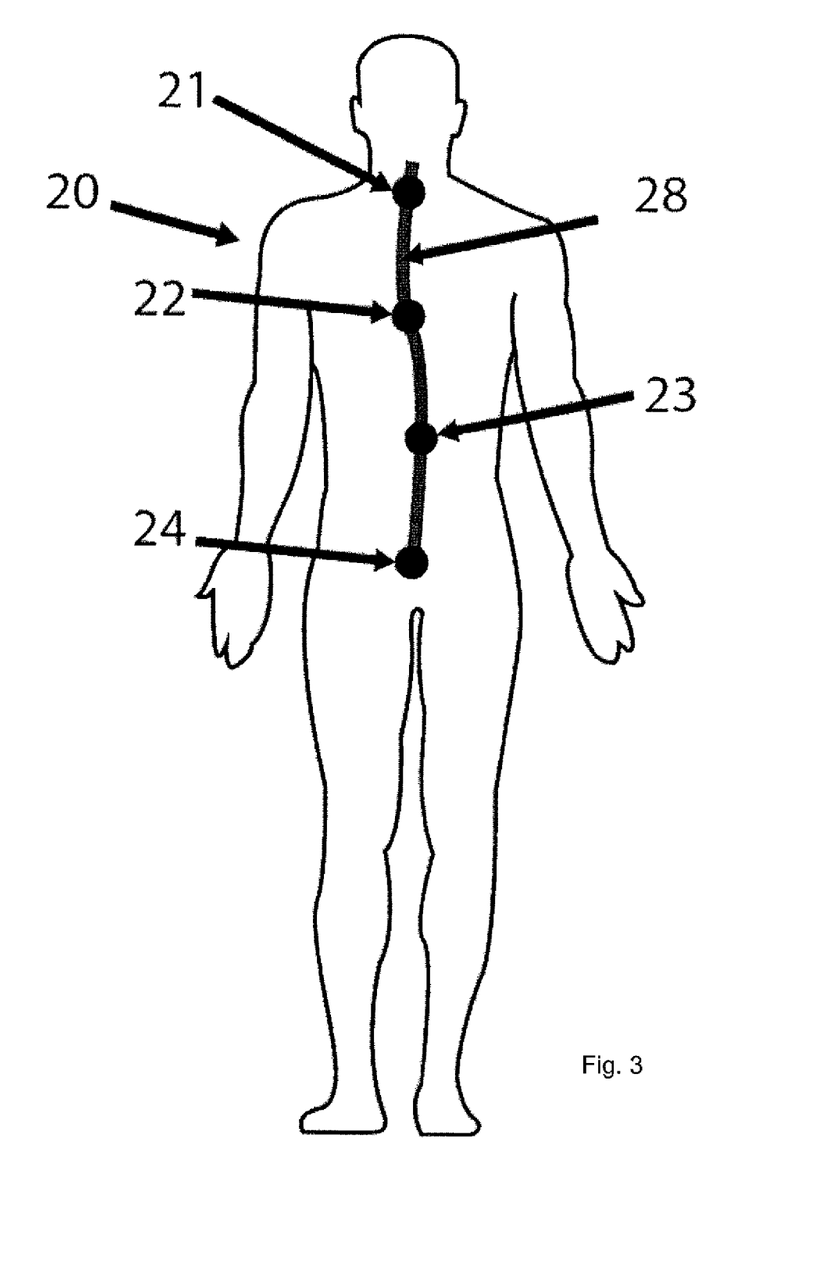
FIG. 3 is a diagrammatic representation of a patient for the measurement of spinal extension/relaxation, showing the positions of the electronic sensing devices of the invention.

FIG. 3 shows how such measurements can be obtained. One sensor 21 is attached at the C7 vertebra and another 24 to the skin on the sacrum, as shown. Intermediate sensors 22 and 23 are attached as appropriate, e.g. on vertebrae TH7 and TH12. All the sensors 21, 22, 23 and 24 can intercommunicate electronically, with one, e.g. 21 or 24, sending out simultaneous radio signals, or signals via a cable, and audible signals, and the other three sensors, with receiving means, recording the exact times of arrival of both signals. The radio signal, or cable signal, is electronic and travels at the speed of light (299 792 458 m/s) but the audible signal travels more slowly at the speed of sound at that time (e.g. 332 m/s) so that there is a time difference (∆t) between the arrival of the two signals at the receptor sensor (after making allowance for any known detection delays in the circuitry). Each sensor may both send and receive signals. If the sensors 21-24 are attached to the patient, e.g. by adhesive means so that the patient can wear them for, say, a full 24 hours, and readings of ∆t are taken at regular time intervals, then the difference between the maximum $\Delta t_H$, i.e. with patient 20 horizontal after a night's sleep, and the minimum $\Delta t_V$, i.e. taken with the patient vertical after activity or after a period of time, will be a function of the spinal shrinkage. Thus, $(\Delta t_H - \Delta t_V) \times 332$ will give the actual shrinkage in metres.

In addition the sensors can give an indication of how much the spine is curved both laterally or posterior/anterior, because multiple sensors can measure distances between each other. If three sensors calculate their distances from each other, a triangle can be drawn to represent the sensors' positions with sides of those lengths, and then if the line of gravity is included (vertical direction), the triangle can be shown the in correct orientation. This triangle will show the positions of the sensors relative to each other in 3D space, and if that scheme is extended to many sensors, then the map of triangles created can represent a model of the body (spine) to which they're attached. The sensors can be accurately placed over extended periods if marks are made on the skin using a medical marker (e.g. as used to provide guidance for future surgery) to line up with a registration point on the sensor. If the sensor is removed and then replaced a few days later, (as long as the mark is still visible) the sensor can essentially be affixed to exactly the same place on the skin. Over a period of time, the sensor map can show if, for example, when standing, the (human patient's spine is becoming more curved or compressed, e.g. as a result of lifestyle or sports injury. Early intervention can prevent further spinal disc damage by encouraging the subject to reduce stresses on the spine or undergo physiotherapy targeting the affected area, because the patient may not know that they are at the start of a process of serious damage.

In other inventions such as motion capture systems, the collection of sensors already have their relative positions defined because they are placed at strategic points of the body such as the joints, and their distances apart are already known—the purpose is to gather data on how the body moves. In this invention, the purpose is to determine how far apart the sensors are without necessarily knowing it in the first place, and then to provide information on how those distances change over time so that for example the changes may indicate present or likely future problems.

The speed of sound in air varies according to various factors such as humidity, so the system can be calibrated just before use by positioning two sensors at a known distance apart, for example exactly 1 m, finding the signal propagation difference described above, and using that as a reference for future propagation differences. An average of measurements may be taken to increase accuracy and to remove false readings caused by echoes from nearby objects.

An accurate clock in each sensor can be used to calculate distance instead of the radio or wired signalling, if each of the sensors' clocks are synchronised or before use. In this arrangement, a sensor emits an audio signal and includes data incorporating its exact time of transmission. The receiving sensor calculates the distance from the sending one using the speed of sound plus its own knowledge of the time when it received the transmission compared with the time from the transmitting sensor, which allows it to calculate the time of travel of the transmission. If the sensors include radio transceivers, they can re-synchronise themselves from time to time if required.

Figure 4:
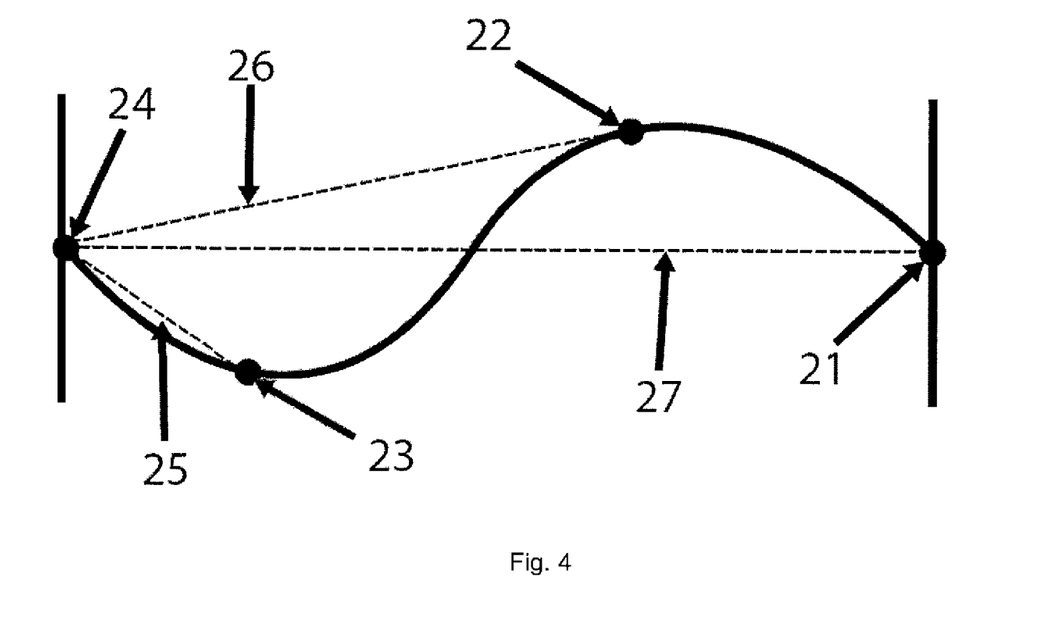
FIG. 4 is a diagrammatic representation of a curved spine as determined by the apparatus of the invention and by the method of using it.

Four sensors 21-24 are shown attached to the patient's spine 28 and they may be used to calculate, via trigonometry using the distances between the sensors, a 3D image and measurement (FIG. 4) of the state of the spine, which can be used to calculate where and to what extent the spine is curved. Regular measurements will determine whether an increase in curvature had occurred during exercise or other activity. A 3D model can be created and oriented correctly using the accelerometers' data to define which way up the model is in space. FIG. 3 shows the distances computed between sensors, e.g. 25 between 24 and 23, 26 between 24 and 22 and 27 between 24 and 21. More sensors 21-24 may be used to identify which particular disc(s) is(are) causing the problem(s). This will be an incredibly powerful diagnostic tool and remove the need for expensive and delicate 'exploratory surgery' to ascertain where a problem is located and its nature. Sensors may be attached, take measurements, then be removed and be re-attached later to measure if any further changes which have taken place in the interim, so that the sensors need not be worn all the time.

In practice, the sound used could be ultrasound, instead of audible sound, so that it did not disturb the patient when asleep and the signals could be sent out periodically with either the absolute values of $\Delta t$ recorded or the differences ($\Delta t_H - \Delta t_V$). Alternatively, the receiving sensor could directly compute the ($\Delta t_H - \Delta t_V$)×332 values and record the time of the measurement for subsequent downloading or display.

Though spinal extension has been used as the example here, the principle has other applications, e.g. to assess problems with hip, knee, ankle or foot joints between when a person is standing and lying down or with shoulder, elbow, wrist or hand joints in a person, who repeatedly has to lift heavy weights above his head, etc.

Though the description above has been written with reference to the treatment of human beings, it is equally applicable to the treatment of animals and measurement of inanimate objects. The skilled person will be aware of many other applications of the invention described herein, all falling within the scope of the invention.

What is claimed is:

1. A goniometry method for obtaining data regarding range of movement and resistance in a joint of a patient, for use in the treatment and care of living beings, the method comprising:

i) providing first and second electronic sensing devices, each attachable to a part of a patient's body, and each of the first and second electronic sensing devices comprising:
  a) an electrical power source;
  b) at least one of an accelerometer, a magnetometer, or a gyroscope;
  c) a memory to record information relating to a measured parameter and store it or to compute a net reading and store it, for downloading and/or transmission to a separate receiving unit; and
  d) a force sensor to monitor and record the force applied to the first and second electronic sensing device; and
ii) providing a receiving unit adapted to receive readings from the first and second electronic sensing devices; and
iii) providing computer circuitry to collate, analyse and display results of an analysis of a net reading from the first and second electronic sensing devices;
iv) attaching the first sensing device to a part of the patient's body on a first side of the joint;
v) attaching the second electronic sensing device to a part of the patient's body on a second side of the joint;
vi) manipulating a patient's appendage with the computer circuitry by applying an amount of input force to the patient's appendage;
vii) measuring with the force sensor the amount of input force applied to the manipulated patient's appendage;
viii) determining the relative movement between the first electronic sensing device and the second electronic sensing device caused by the measured amount of input force; and
viv) recording the determined relative movement and the measured amount of input force.

2. The method as set out in claim 1, wherein the displacement between the first and second electronic sensing devices is determined by monitoring the deflection angle, or angles, between the first electronic sensing device and the second electronic sensing device and from monitoring any rotation between the two.

3. A goniometry system for obtaining data regarding a range of movement and resistance in a joint of a patient in the treatment and care of the patient, comprising:

i) first and second electronic sensing devices each configured for attachment to a patient's body at respective sides of a joint, and each of the first and second electronic sensing devices including:
  at least one of an accelerometer, a magnetometer, or a gyroscope for monitoring movement of the respective first and second electronic sensing device and providing monitored movement readings;
  a force sensor to monitor and record the force applied to the first and second electronic sensing devices during manipulation of the joint; and
  a memory to record information relating to a measured parameter and store it, for downloading and/or transmission;
ii) a receiving unit configured to receive readings from the first and second electronic sensing devices and either process or display them directly or to pass them to a further unit for processing and display; and
iii) a processor for:
  receiving from the force sensor an amount of input force applied to an appendage of the patient to manipulate the appendage;
  determining the relative movement between the first electronic sensing device and the second electronic sensing device caused by the measured amount of input force; and
  recording the determined relative movement and the measured amount of input force.

4. The system as claimed in claim 3, wherein the first and second electronic sensing devices are powered by electrical power derived from at least one of body heat of the patient and energy harvested from motion of electromagnetic means.

5. The system as claimed in claim 3, wherein the first and second electronic sensing devices each include a timing clock.

6. The system as claimed in claim 3, wherein the receiving unit is configured to be carried by the patient.

7. A method of using the system of claim 3, comprising the steps of:
- directing the attachment of the first and second electronic sensing devices to respective sides of the joint;
- downloading or transmitting recorded movement and force readings, or a net reading;
- using the receiving unit to receive the readings or net reading and passing the readings or net reading to the processor; and
- using the processor to analyse the readings to determine the range of motion of the joint and displaying or transmitting the results of the analysis.

* * * * *